US012063580B2

(12) United States Patent
Mahidhara et al.

(10) Patent No.: US 12,063,580 B2
(45) Date of Patent: *Aug. 13, 2024

(54) METHOD AND APPARATUS FOR PROVIDING A SECURE COMMUNICATION IN A SELF-ORGANIZING NETWORK

(71) Applicant: Google Technology Holdings LLC, Mountain View, CA (US)

(72) Inventors: Shravan Mahidhara, Palatine, IL (US); Vasanthi Raghuram, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,085

(22) Filed: Jan. 24, 2023

(65) Prior Publication Data

US 2023/0164533 A1    May 25, 2023

Related U.S. Application Data

(63) Continuation of application No. 17/446,177, filed on Aug. 27, 2021, now Pat. No. 11,576,023, which is a
(Continued)

(51) Int. Cl.
*H04W 4/80*    (2018.01)
*H04L 9/40*    (2022.01)
(Continued)

(52) U.S. Cl.
CPC .......... *H04W 4/80* (2018.02); *H04L 63/0428* (2013.01); *H04L 63/08* (2013.01); *H04W 28/18* (2013.01);
(Continued)

(58) Field of Classification Search
CPC ....... H04W 4/80; H04W 28/18; H04W 48/16; H04W 76/00; H04W 84/18; H04L 63/0428; H04L 63/08
See application file for complete search history.

(56) References Cited

U.S. PATENT DOCUMENTS 7,342,906 B1    3/2008  Calhoun
7,596,368 B2    9/2009  Yamada et al.
(Continued)

OTHER PUBLICATIONS

Kent, RFC 4303—IP Encapsulating Security Payload (ESP), Dec. 2005, IETF, pp. 1-44 (Year: 2005).*
(Continued)

*Primary Examiner* — Kevin Bechtel
*Assistant Examiner* — Forrest L Carey
(74) *Attorney, Agent, or Firm* — Honigman LLP; Brett A. Krueger

(57) ABSTRACT

A communication system provides secure communication between two nodes in a self-organizing network without the need for a centralized security or control device. A first node of the two nodes is provisioned with one or more security profiles, auto-discovers a second node of the two nodes, authenticates the second node based on a security profile of the one or more security profiles, selects a security profile of the one or more security profiles to encrypt a communication session between the two nodes, and encrypts the communication session between the two nodes based on the selected security profile. The second node also is provisioned with the same one or more security profiles, authenticates the first node based on a same security profile as is used to authenticate the second node, and encrypts the communication session based on the same security profile as is used for encryption by the first node.

20 Claims, 2 Drawing Sheets

Related U.S. Application Data continuation of application No. 15/783,244, filed on Oct. 13, 2017, now Pat. No. 11,129,009, which is a continuation of application No. 13/012,057, filed on Jan. 24, 2011, now Pat. No. 9,794,731.

(60) Provisional application No. 61/429,001, filed on Dec. 31, 2010.

(51) Int. Cl.
| | |
|---|---|
| *H04W 28/18* | (2009.01) |
| *H04W 48/16* | (2009.01) |
| *H04W 76/00* | (2018.01) |
| *H04W 84/18* | (2009.01) |

(52) U.S. Cl.
CPC ............ *H04W 48/16* (2013.01); *H04W 76/00* (2013.01); *H04W 84/18* (2013.01)

(56) References Cited

U.S. PATENT DOCUMENTS

| | | | |
|---|---|---|---|
| 2002/0069278 A1 | 6/2002 | Forslow | |
| 2004/0260701 A1* | 12/2004 | Lehikoinen | ......... H04L 12/1895 |
| 2006/0264227 A1 | 11/2006 | Takahashi et al. | |
| 2008/0086760 A1 | 4/2008 | Jiang et al. | |
| 2008/0289027 A1* | 11/2008 | Yariv | .................. H04L 63/0227 726/11 |
| 2011/0178933 A1* | 7/2011 | Bailey, Jr. | ............... H04L 63/20 726/1 |
| 2011/0188659 A1 | 8/2011 | Khalid et al. | |

OTHER PUBLICATIONS

3GPPTS36.300v8.9.0"3rdGenerationPartnershipProject;TechnicalSpecificationGroupRadioAccessNetwork; EvolvedUniversalTerrestrialRadioAccess(EOUTRA)andEvolvedUniversalTerrestrialRadioAccessNetwork(E-UTRAN); Overalldescription;Stage2(Release8)"(Jun. 2009)allpages.

3GPPTR36.902v1.2.03rdGenerationPartnershipProject;TechnicalSpecificationGroupRadioAccessNetwork; EvolvedUniversalTerrestrialRadioAccessNetwork(E-UTRAN);Self-confomringandself-optimizingnetworkusecasesandsolutions(Release9)(May 2009)allpages.

KaufmanetalRFC5996—InternetKeyExchangeProtocolVersion2(IKEv2)Sep. 2010IETFpp. 1-139.

KentRFC4303—IPEncapsulatingSecurityPayload(ESP)Dec. 2005IETFpp. 1-44.

* cited by examiner

100

200

METHOD AND APPARATUS FOR PROVIDING A SECURE COMMUNICATION IN A SELF-ORGANIZING NETWORK

CROSS REFERENCE TO RELATED APPLICATIONS

This U.S. patent application is a continuation of, and claims priority under 35 U.S.C. § 120 from, U.S. patent application Ser. No. 17/446,177, filed on Aug. 27, 2021, which is a continuation of U.S. patent application Ser. No. 15/783,244, filed on Oct. 13, 2017, now U.S. Pat. No. 11,129,009, which is a continuation of U.S. patent application Ser. No. 13/012,057, filed on Jan. 24, 2011, now U.S. Pat. No. 9,794,731, which claims priority under 35 U.S.C. § 119(e) to U.S. Provisional Application 61/429,001, filed on Dec. 31, 2010. The disclosures of these prior applications are considered part of the disclosure of this application and are hereby incorporated by reference in their entireties.

TECHNICAL FIELD

This disclosure relates generally to self-organizing networks, and more specifically to security mechanisms for a self-organizing network (SON).

BACKGROUND

Before a communication channel is established between any two nodes in a wireless communication network, the nodes need to mutually authenticate each other and thereafter establish a secure communication channel. Typically, in a pre-configured communication network, secure parameters for authentication and establishment of a secure channel is are assigned based on pre-determined configuration data. However, in a self-organizing network (SON), such as such as a self-configuring and self-optimizing network, where nodes are auto-discovered, each node dynamically learns the existence of the other nodes and, correspondingly, parameters for authentication and establishment of a secure channel cannot be pre-configured.

Nevertheless, node authentication and link security are important to both an "advertising" node and a "discovering" node in a SON to prevent a malicious or unauthorized user from gaining access to the network and the nodes. Accordingly, use of a centralized security server or other centralized control network element that establishes credentials for, and performs, node authentication has been suggested, but this requires additional investment in cellular infrastructure and also reduces the operability of a SON, typically a highly operable network.

Therefore, a need exists for a method and apparatus for distributing security information across a SON without the need to employ a centralized server.

Figure 1:
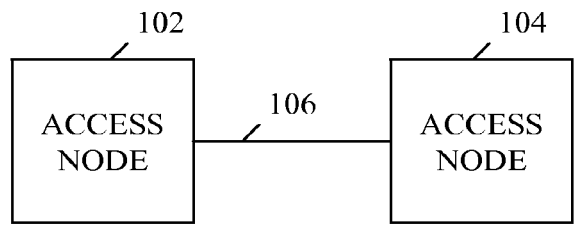
FIG. 1 is a block diagram of a communication system in accordance with various embodiments described herein.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments described herein. Also, common and well-understood elements that are useful or necessary in a commercially feasible embodiment are often not depicted in order to facilitate a less obstructed view of these various embodiments described herein.

DETAILED DESCRIPTION

To address the need that exists for a method and apparatus for distributing security information across a self-organizing network (SON) without the need to employ a centralized server, a communication system is provided that provides secure communication between two nodes in a self-organizing network without the need for a centralized security or control device. A first node of the two nodes is provisioned with one or more security profiles, auto-discovers a second node of the two nodes, authenticates the second node based on a security profile of the one or more security profiles, selects a security profile of the one or more security profiles to encrypt a communication session between the two nodes, and encrypts the communication session between the two nodes based on the selected security profile. The second node also is provisioned with the same one or more security profiles, authenticates the first node based on a same security profile as is used to authenticate the second node, and encrypts the communication session based on the same security profile as is used for encryption by the first node.

Generally, an implementation herein encompasses a method for providing a secure communication in a self-organizing network. The method includes maintaining, at a first network node, one or more security profiles, auto-discovering, by the first network node, a second network node, authenticating, by the first network node, the second network node based on a security profile of the one or more security profiles, selecting a security profile of the one or more security profiles to encrypt a communication session between the first network node and the second network node, and encrypting the communication session between the first network node and the second network node based on the selected security profile.

Another implementation herein encompasses a network node capable of establishing secure communication in a self-organizing network. The network node includes at least one memory device that is configured to maintain one or more security profiles. The network node further includes a processor that is configured to auto-discover another network node, authenticate the second network node based on a security profile of the one or more security profiles, select a security profile of the one or more security profiles to encrypt a communication session between the network node and the another network node, and encrypt the communication session between the network node and the another network node based on the selected security profile.

Yet another implementation herein encompasses a system for establishing secure communication in a self-organizing network. The system includes a first network node that is configured to maintain one or more security profiles, auto-discover a second network node, authenticate the second network node based on a security profile of the one or more security profiles, select a security profile of the one or more security profiles to encrypt a communication session between the first network node and the second network node, and encrypt the communication session between the first network node and the second network node based on the selected security profile. The system further includes the second network node, wherein the second network node is configured to maintain a same one or more security profiles as the first network node and authenticate the first network node based on a same security profile of the one or more security profiles as the security profile used by the first network node to authenticate the second network node.

Turning now to the drawings, implementations herein may be more fully described with reference to FIGS. 1-3. FIG. 1 is a block diagram of a communication system 100 in accordance with various embodiments described herein. Communication system 100 is a self-organizing network (SON) 100 that includes multiple access nodes 102, 104 (two shown). Communication system 100 may be any type of network where access nodes, such as access nodes 102 and 104, auto-discover the presence of neighboring access nodes, for example, through known node "advertising" and "discovery" processes, such as a mesh network or any other type of self-configuring and self-optimizing network. Preferably, communication system 100 operates in accordance with the 3GPP LTE (Third generation Partnership Project Long Term Evolution) standards, for example, in accordance with Technical Report (TR) 36.902 which provides protocols for operation of a SON network in a 3GPP LTE communication system. However, communication system 100 may be any type of communication system that supports a SON network, such as but not limited to a NGMN (Next Generation Mobile Networks) communication system, a UMTS (Universal Mobile Telecommunications System) communication system, or a communication system that operates in accordance with any one of the IEEE (Institute of Electrical and Electronics Engineers) 802.xx standards, for example, the 802.11, 802.15, 802.16, or 802.20 standards.

Each access node 102, 104 may be any kind of network element that provides wireless access, either directly or indirectly (via one or more other access nodes, such as in a mesh network), to a network, for other access nodes and/or user terminals within communication range of the access node. Access nodes 102 and 104 also may be referred to herein as network nodes. For example, each access node 102, 104 may be an infrastructure element, such as a base station, an access point, or a Node B, or may be a mobile terminal such as a mobile station, user equipment, or subscriber station. Each access node 102, 104, such as access node 102, communicates with a neighboring access node, such as access node 104, via an intervening communication link 106, which link may be a wireless link, a wireline link, or a combination of a wireless link and a wireline link. Communication link 106 includes one or more signaling links and one or more traffic links and supports an exchange of signaling and an exchange of traffic between access nodes 102 and 104.

Figure 2:
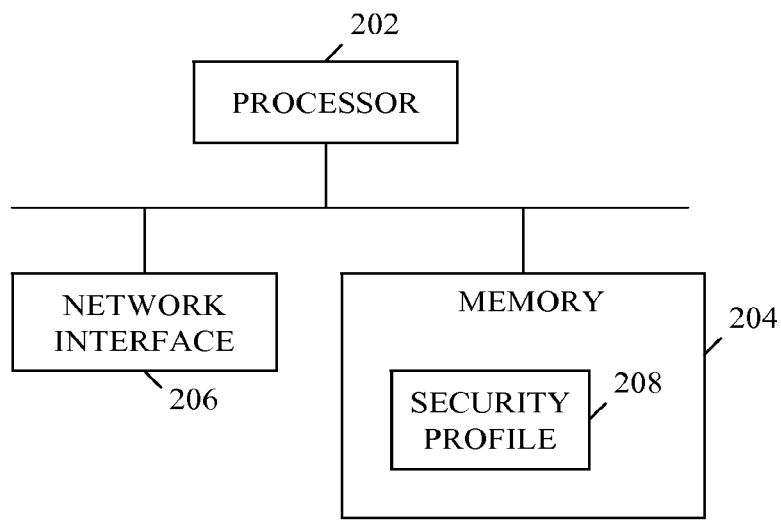
FIG. 2 is a block diagram of an access node of the communication system of FIG. 1 in accordance with an embodiment described herein.

FIG. 2 is a block diagram of an access node 200, such as access nodes 102 and 104. Access node 200 includes a processor 202, such as one or more microprocessors, microcontrollers, digital signal processors (DSPs), customized processors, field programmable gate arrays (FPGAs), or combinations thereof or such other devices known to those having ordinary skill in the art, which processor is configured to execute the functions described herein as being executed by the access node. Access node 200 further includes an at least one memory device 204, such as but are not limited to a hard disk, a CD-ROM, an optical storage device, a magnetic storage device, random access memory (RAM), dynamic random access memory (DRAM), a ROM (Read Only Memory), a PROM (Programmable Read Only Memory), an EPROM (Erasable Programmable Read Only Memory), an EEPROM (Electrically Erasable Programmable Read Only Memory) a Flash memory, or equivalents thereof that is coupled to the processor and that maintains data and programs that may be executed by the associated processor and that allows the access node to perform all functions necessary to operate in communication system 100. For example, at least one memory device 204 may maintain information concerning communication system protocols and a version of each of various types of software supported by the access node, hardware types and types of network interfaces included in the access node, an identifier of the access node such as a base station identifier or a mobile station identifier, an identifier of one or more of a subnet and a domain associated with the access node, such as a subnet identifier or a node FQDN (Fully Qualified Domain Name), an address of the access node, such as an Internet Protocol (IP) address that may be allocated to the access node when it initializes in, or registers with, communication system 100, and identifiers of various ports (for example, port numbers) of the access node.

At least one memory device 204 further maintains a default security profile module 208 that maintains one or more security profiles that are common to both access nodes 102 and 104. Default security profile module 208 may be provisioned to the access node by an operator of communication system 100 at any time prior to the module's utilization to establish a secure link, for example, at the factory, at installation of the access node in the network, at purchase of the node by a user, or via a secure communication between the operator and the access node.

Each security profile includes information utilized to set up a secure link between two access nodes, for example, one or more encryption keys and any other security parameters that may be used to support standardized or proprietary authentication and/or encryption algorithms. Typically, such security parameters are data link layer parameters that are used to perform encryption at the data link layer. However, one of ordinary skill in the art realizes that implementations herein apply to any protocol layer that may provide encrypted communications. Default security profile module 208 may further maintain a table or algorithm for use in selecting a security profile, from among multiple security profiles maintained by the module that will be utilized to secure a communication link. For example, in one implementation, when default security profile module 208 includes multiple security profiles, default security profile module 208 may include a table of security profiles, which table maintains an association between each security profile and one or more security profile selection parameters. In another implementation, when default security profile module 208 includes multiple security profiles, default security profile module 208 may include a security profile selection algorithm for selecting a security profile from among the multiple security profiles based on one or more security profile selection parameters, wherein an algorithm output identifies a security profile based on security profile selection parameters input to the algorithm.

Access node 200 further includes at least one network interface module 206 for interfacing with other access nodes via an intervening communication link, such as communication link 106. When the intervening communication link is a wireless communication link, network interface module 206 may include at least one radio frequency (RF) receiver (not shown) and at least one RF transmitter (not shown) for wirelessly receiving signals from, and transmitting signals to, the other access nodes.

Unless otherwise specified herein, the functionality described herein as being performed by access nodes 102 and 104 is implemented with or in software programs and instructions stored in the at least one memory device 204 of the access node and executed by the processor 202 of the access node. However, one of ordinary skill in the art realizes that implementations herein alternatively may be implemented in hardware, for example, integrated circuits (ICs), application specific integrated circuits (ASICs), and the like, such as ASICs implemented in one or more of the UE, access node, MME, and MSC. Based on the present disclosure, one skilled in the art will be readily capable of producing and implementing such software and/or hardware without undo experimentation.

Figure 3:
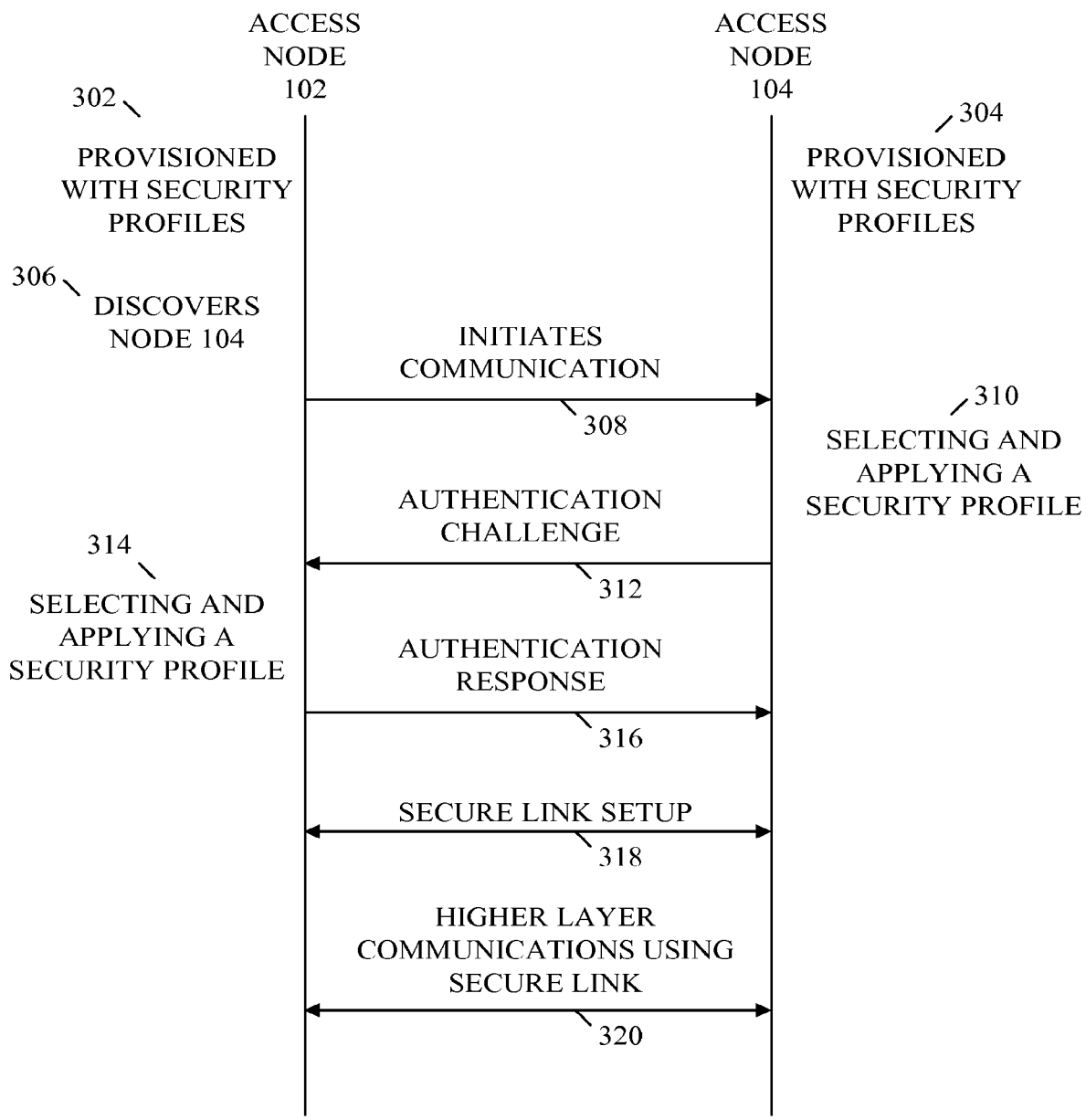
FIG. 3 is a signal flow diagram illustrating a method executed by the communication system of FIG. 1 in securing a communication between two access nodes in accordance with various embodiments described herein.

Referring now to FIG. 3, a signal flow diagram 300 is provided that illustrates a method executed by communication system 100 in securing a communication, such as a communication over communication link 106, between two access nodes, that is, access nodes 102 and 104, in accordance with various embodiments described herein. Signal flow diagram 300 begins when each of access nodes 102 and 104 is provisioned (302, 304) with default security profile module 208. As described above, the default security profile module 208 may be provisioned to access nodes 102 and 104 at any time prior to the access nodes' attempt establish a secure link between each other. Each access node 102, 104 stores the provisioned default security profile module 208 in the at least one memory device 204 of the access node.

A first access node, for example, access node 102, of the two access nodes 102, 104 then initiates an access node discovery process by which it discovers (306) neighbor access nodes, such as access node 104. As part of the access node discovery process, each of the first and second access nodes 102, 104 discover and store, in the at least one memory device 204 of the access node, an access node identifier associated with the other access node, such as but not limited to a base station identifier, a mobile station identifier, a node FQDN (Fully Qualified Domain Name), a routing address such as an Internet Protocol (IP) address, or a subnet identifier associated with the access nodes.

Many node discovery processes are known in the art and any such node discovery process may be used herein without departing from the spirit and scope of implementations herein. For example, the 3GPP LTE standards, and in particular section 22.3 of Technical Specification (TS) 36.300, describe an Automatic Neighbor Relation (ANR) function that provides for a Node B to discover neighboring Node Bs and to build and maintain a table of the neighbor Node Bs, which table includes a cell identifier associated with each of the neighbor Node Bs. By way of another example, PCT International Publication Number WO2007/001953 describes a scheme that utilizes the Internet Control Message Protocol (ICMP), and in particular ICMP Echo packets and ICMP Echo Reply packets, for a sender node to discover addresses of all receiver nodes along a packet route. By way of still other examples, in the realm of mobile ad hoc networks, a variety of routing protocols exist by which a mobile node discovers neighbor mobile nodes. For example, in table-based mobile ad hoc protocols, each mobile node assembles and maintains a routing table including routing information for the neighbor mobile nodes, which routing information may be based on "hello" messages broadcast by each such mobile node. By way of another example, in on-demand mobile ad hoc protocols, a source mobile node that requires a route to a destination node initiates a route discovery process by which the source node broadcasts a discovery message and a receiving node replies back to the source node.

At some point in time after discovering second access node 104, first access node 102 determines to set up (308) a communication session with the second access node and conveys, to the second access node, a communication session initiation message. For example, the first access node may self-determine to initiate the communication session, or a user terminal or access node served by the first access node may attempt to set up a communication session via the first access node and, in response, the first access node then attempts to set up a communication session with the second access node. The communication session initiation message may include one or more of a type of communication session being initiated (and correspondingly indicating or implying a channel type sought to be set up) and a port number and/or medium access control (MAC) layer address assigned to the communication session by the first access node 102.

In response to receiving the communication session initiation message, second access node 104 selects (310) a security profile, from among the one or more security profiles maintained by the default security profile module 208 of the access node, for use in encrypting the communication session. The selection of a security profile from among one or more security profiles may be based on any one or more parameters that are known to both second access node 104 and, at the time first access node 102 selects a corresponding security profile, the first access node, which one or more parameters may be inferred from characteristics of the communication session being set up. As such parameters are utilized to select a security profile from among the multiple security profiles maintained by default security profile module 208, such parameters also may be referred to herein as security profile selection parameters. For example and as described in greater detail above, when default security profile module 208 of access node 104 includes multiple security profiles, the access node may select a security profile based on a value associated with each of the one or more parameters and by reference to a security profile table maintained by the default security profile module, or by execution of a security profile selection algorithm maintained by the default security profile module using the one or more security profile selection parameters.

For example, a security profile selection parameter may be a physical communication link type (that is, a type of medium that will be used, for example, Ethernet or wireless), a channel type (for example, one of multiple types of signaling or traffic channels) or channel characteristics (for example, parameters associated with frequencies, time slots, or channel coding that may be employed), or a network interface type that will be utilized by the access nodes for the communication session, an identifier associated with the physical communication link, a communication protocol that will be applied to data that is exchanged over the communication link, or endpoint identifiers, such as a port number or medium access control (MAC) layer address that will be utilized by an access node for communications between the access nodes or an access node identifier associated with either or both access nodes, such as a base station identifier, a mobile station identifier, a node FQDN (Fully Qualified Domain Name), an address, such as an Internet Protocol (IP) address, of either access node, or a subnet identifier associated with the access nodes. Each access node may discover the access node identifier associated with the other access node during the access node discovery process, or the access node identifier of the other access node may be discovered, and stored, as a result of previous communication sessions between the two nodes during which such information was exchanged, for example, as part of a set up of the previous session.

Second access node 104 then assembles and conveys (312) to first access node 102 an encrypted authentication challenge message. In one implementation, when only a single security profile selection parameter is used to select a default security profile from among multiple default security profile parameters, second access node 104 may encrypt the authentication challenge message based on the security profile selected at step 310. In another implementation, when multiple security profile selection parameters are used to select a security profile from among multiple security profiles, second access node 104 may include, in an unencrypted portion of the authentication challenge message, an indication of one or more security profile selection parameters used to select the security profile. In yet another implementation, second access node 104 may encrypt the authentication challenge message based on a security profile that is maintained in the default security profile module 208 of the access node and that is pre-designated for use in authentication challenges and responses, so that both the second and first access nodes 104, 102 are able to respectively encrypt and decrypt the authentication challenge message without exchanging an indication of a selection of a particular default security profile. In this last instance, the authentication challenge message may include an indication of the security profile selection parameters used to select a security profile for the communication session.

In response to receiving the encrypted authentication challenge message, first access node 102 selects (314) a default security profile by reference to default security profile module 208 of the first access node, decrypts the message based on the same security profile used by second access node 104 to encrypt the message, and authenticates the second access node. For example, when only a single security profile selection parameter is used to select a security profile from among multiple security profile parameters, both the first and second access nodes 104, 102 are able to determine a same value for this parameter (for example, a physical communication link type, a network interface type, a port number or a MAC layer address assigned to the communication session by the first access node, or an access node identifier) and thus are able to select a same security profile for their communication session. In other implementations, first access node 102 may select a security profile for decrypting the authentication challenge message based on an indication, in the message, of one or more security profile selection parameters used by second access node 104 to select a security profile to encrypt the message, or by use of a pre-designated default security profile for use in encrypting authentication challenges and responses. First access node 102 then may authenticate the second access node by determining that the second access node has used a security profile that is recognizable by the first access node, or by any other self-authentication technique known in the art.

First access node 102 then assembles, and conveys (316) to second access node 104, an authentication response message that is encrypted by the first access node using the same security profile as used to encrypt the authentication challenge message. In response to receiving the authentication response message, second access node 104 decrypts the authentication response message based on the same security profile used by first access node 102 to encrypt the message and authenticates the first access node. For example, second access node 104 may authenticate first access node 102 by determining that the first access node has used a default security profile that is recognizable by the second access node, or by any other self-authentication technique known in the art.

After first and second access nodes 102, 104 successfully exchange the authentication challenge and response messages and authenticate each other, the first and second access nodes 102, 104 set up (318) a secure communication link between the two nodes in accordance with known techniques and using the security parameters, such as one or more encryption keys, associated with the selected security profile. Typically, such security would be provided at the data link layer, although one of ordinary skill in the art realizes that implementations herein apply to any protocol layer that may provide encrypted communications. In response to setting up a secure communication session, first and second access nodes 102, 104 then engage (320) in an exchange of higher layer communications, such as application layer communications, using the secure communication link, and signal flow diagram 300 ends.

By maintaining one or more same security profiles at each of access node 102 and 104 and using, by each access node, the security profiles to authenticate each other and to encrypt a communication session between the two access nodes 102, 104, communication system 100 provides for authentication and secure communications between the two nodes without the need for a centralized security server or other centralized control network element. When each of access nodes 102 and 104 maintains multiple security profiles, communication system 100 facilitates a selection of a same security profile at each of access nodes 102, 104 by providing for the access nodes to select a security profile of the multiple security profiles based on a security profile selection parameter known to both access nodes, which security profile selection parameter may be inferred from characteristics of the communication session being set up.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method that, when executed by data processing hardware of a first network node of a self-organizing network, causes the data processing hardware to perform operations comprising:
   obtaining a first table of security profiles stored at a first memory device of the first network node;
   after obtaining the first table of security profiles;
      discovering a second network node of the self-organizing network; and
      receiving, from the second network node, an authentication challenge message comprising:
         an encrypted portion encrypted based on a respective one of the security profiles selected by the second network node from a second table of security profiles stored at a second memory device of the second network node prior to the first network node discovering the second network node, the second table comprising the same security profiles as the first table, the respective one of the security profiles associated with a value of a security profile selection parameter in the second table of security profiles; and
         an unencrypted portion identifying the respective one of the security profiles selected by the second network node;
   selecting, from the first table of security profiles, based on the unencrypted portion of the authentication challenge message, the respective one of the security profiles selected by the second network node;
   decrypting the encrypted portion of the authentication challenge message using the selected respective one of the security profiles; and
   based on decryption of the encrypted portion, authenticating the second network node.

2. The method of claim 1, wherein the operations further comprise transmitting, to the second network node, a communication session initiation message.

3. The method of claim 2, wherein the communication session initiation message comprises at least one of:
   a type of a communication session being initiated between the first network node and the second network node;
   a port number assigned to the communication session; or
   a medium access control (MAC) layer address assigned to the communication session.

4. The method of claim 1, wherein the operations further comprise transmitting, to the second network node, an authentication response to the authentication challenge message, the authentication response encrypted based on the selected respective one of the security profiles.

5. The method of claim 4, wherein, in response to the authentication response, the second network node authenticates the first network node.

6. The method of claim 5, wherein the operations further comprise, after the second network node authenticates the first network node, establishing a secure communication link between the first network node and the second network node.

7. The method of claim 6, wherein the operations further comprise, in response to establishing the secure communication link, providing an application layer communication to the second network node.

8. The method of claim 1, wherein the value of the security profile selection parameter is based on a physical communication link type.

9. The method of claim 1, wherein the value of the security profile selection parameter is based on a characteristic of a channel to be used in a communication session between the first network node and the second network node.

10. The method of claim 9, wherein the characteristic of the channel is associated with frequencies, time slots, or channel coding for the communication session between the first network node and the second network node.

11. A system comprising:
   data processing hardware of a first network node of a distributed, self-organizing network; and
   memory hardware in communication with the data processing hardware, the memory hardware storing instructions that when executed on the data processing hardware cause the data processing hardware to perform operations comprising:
      obtaining a first table of security profiles stored at a first memory device of the first network node;
      after obtaining the first table of security profiles;
         discovering a second network node of the self-organizing network; and
         receiving, from the second network node, an authentication challenge message comprising:
            an encrypted portion encrypted based on a respective one of the security profiles selected by the second network node from a second table of security profiles stored at a second memory device of the second network node prior to the first network node discovering the second network node, the second table comprising the same security profiles as the first table, the respective one of the security profiles associated with a value of a security profile selection parameter in the second table of security profiles; and an unencrypted portion identifying the respective one of the security profiles selected by the second network node;

selecting, from the first table of security profiles, based on the unencrypted portion of the authentication challenge message, the respective one of the security profiles selected by the second network node;

decrypting the encrypted portion of the authentication challenge message using the selected respective one of the security profiles; and based on decryption of the encrypted portion, authenticating the second network node.

12. The system of claim 11, wherein the operations further comprise transmitting, to the second network node, a communication session initiation message.

13. The system of claim 12, wherein the communication session initiation message comprises at least one of:

a type of a communication session being initiated between the first network node and the second network node;

a port number assigned to the communication session; or a medium access control (MAC) layer address assigned to the communication session.

14. The system of claim 11, wherein the operations further comprise transmitting, to the second network node, an authentication response to the authentication challenge message, the authentication response encrypted based on the selected respective one of the security profiles.

15. The system of claim 14, wherein, in response to the authentication response, the second network node authenticates the first network node.

16. The system of claim 15, wherein the operations further comprise, after the second network node authenticates the first network node, establishing a secure communication link between the first network node and the second network node.

17. The system of claim 16, wherein the operations further comprise, in response to establishing the secure communication link, providing an application layer communication to the second network node.

18. The system of claim 11, wherein the value of the security profile selection parameter is based on a physical communication link type.

19. The system of claim 11, wherein the value of the security profile selection parameter is based on a characteristic of a channel to be used in a communication session between the first network node and the second network node.

20. The system of claim 19, wherein the characteristic of the channel is associated with frequencies, time slots, or channel coding for the communication session between the first network node and the second network node.

* * * * *